No. 644,490. Patented Feb. 27, 1900.
J. T. ARGO.
DUMPING CAR.
(Application filed June 22, 1899.)
(No Model.) 2 Sheets—Sheet 1.
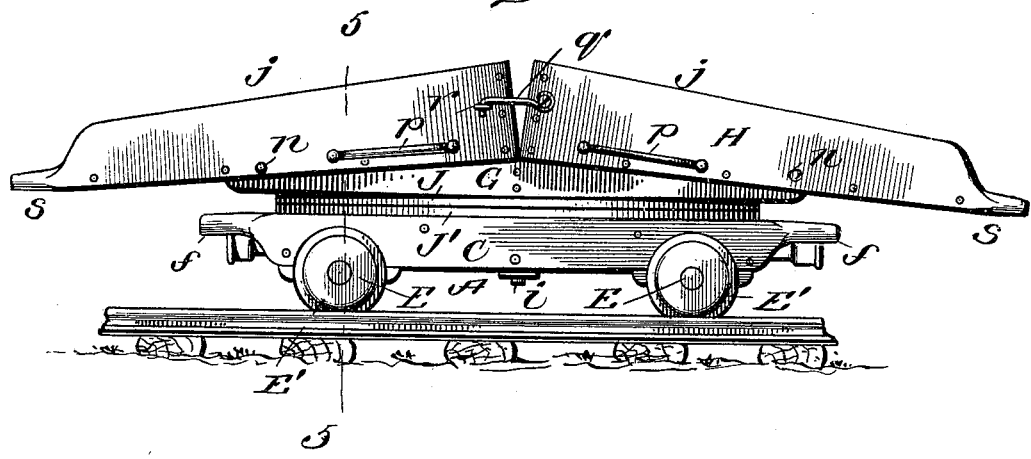
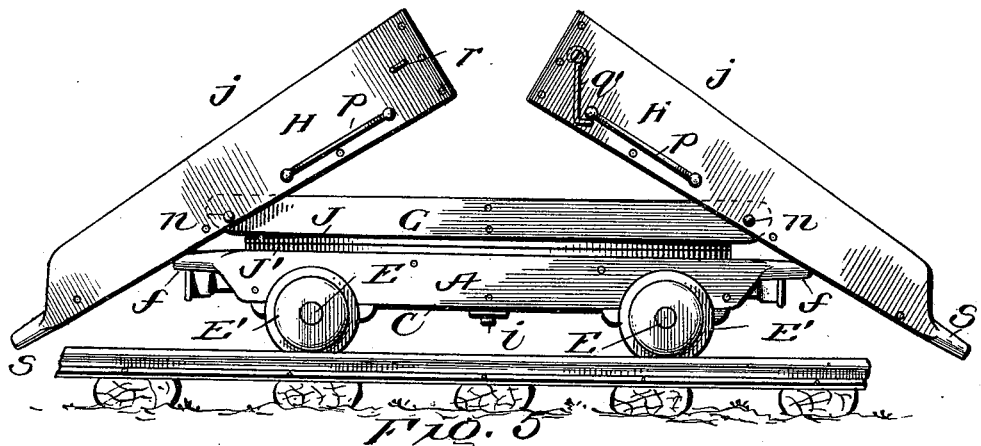
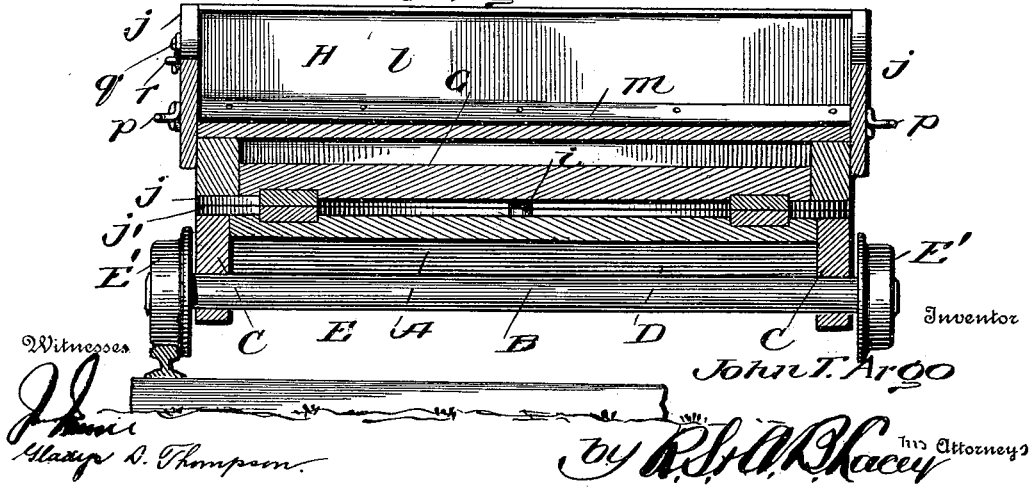
Inventor
John T. Argo No. 644,490. Patented Feb. 27, 1900.
J. T. ARGO.
DUMPING CAR.
(Application filed June 22, 1899.)
(No Model.) 2 Sheets—Sheet 2.
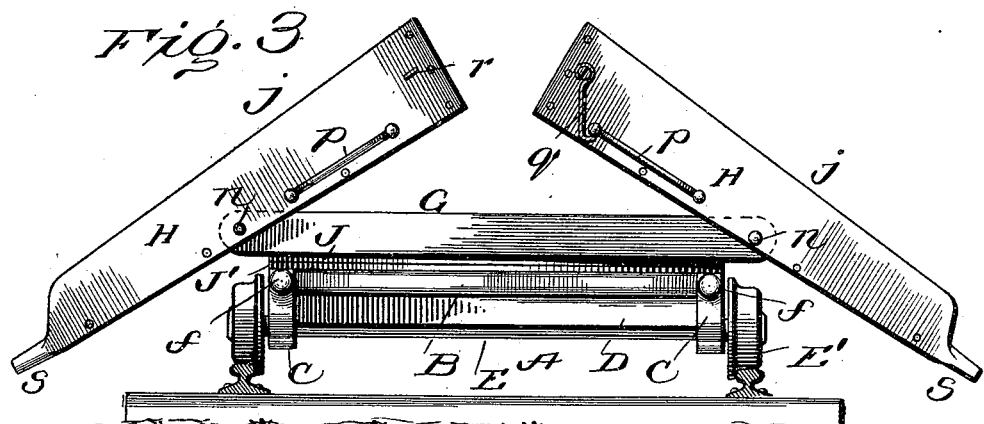
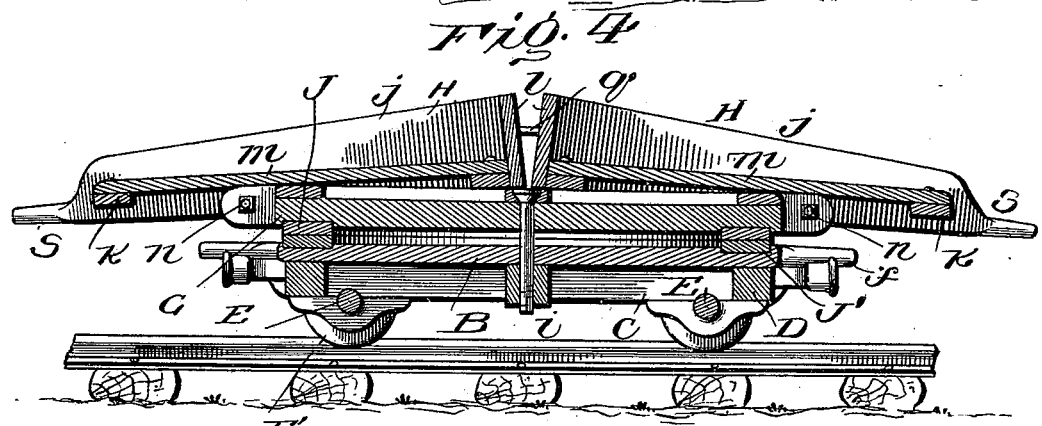
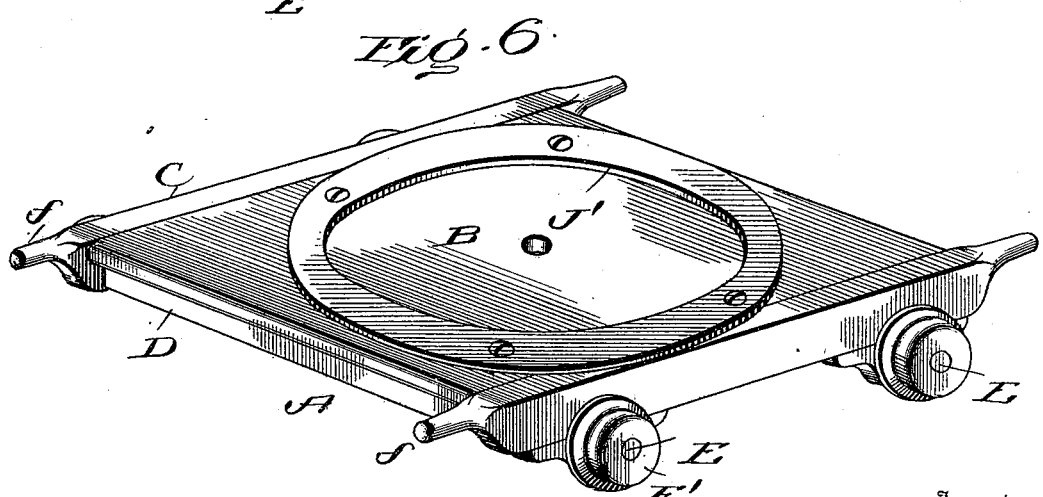
Witnesses
Inventor
John T. Argo
by R. S. & A. B. Lacey, his Attorneys

UNITED STATES PATENT OFFICE.

JOHN T. ARGO, OF POINDEXTER, KENTUCKY, ASSIGNOR OF TWO-THIRDS TO JOHN WIGLESWORTH AND FRED McCARTY, OF SAME PLACE.

DUMPING-CAR.

SPECIFICATION forming part of Letters Patent No. 644,490, dated February 27, 1900.

Application filed June 22, 1899. Serial No. 721,462. (No model.)

*To all whom it may concern:*

Be it known that I, JOHN T. ARGO, a citizen of the United States, residing at Poindexter, in the county of Harrison and State of Kentucky, have invented certain new and useful Improvements in Dumping-Cars; and I do hereby declare the following to be a full, clear, and exact description of the invention, such as will enable others skilled in the art to which it appertains to make and use the same.

This invention relates to improvements in dumping-cars for use on railroads for ditching and general work in constructing and repairing road-beds; and one object is to provide a car of this character which is simple in construction and adapted to serve the combined purposes of a hand-car or truck and dumping-car.

A further object of the invention is to provide a dumping-body which may be quickly and conveniently removed, so that its supporting wheeled platform or truck may be employed as a hand-car, and which is rotatably mounted, so that the load may be discharged in the center of the track, on either side of the track, or simultaneously on both, as desired.

With these and other minor objects in view the invention consists of certain novel features of construction, combination, and arrangement of parts, as will be hereinafter more fully described, and particularly pointed out in the appended claims.

In the drawings hereto annexed and forming a part of this specification, Figure 1 is a side elevational view of a dumping-car embodying my invention. Fig. 2 is a similar view showing the boxes tilted to dump the load. Fig. 3 is an end elevation showing the body turned at right angles to its normal position to dump the load at the sides. Fig. 4 is a central vertical longitudinal section through the car, with parts arranged as in Fig. 1. Fig. 5 is a cross-section on line 5 5 of Fig. 1. Fig. 6 is a perspective view of the wheeled platform or truck.

Referring now more particularly to the drawings, wherein like reference-letters designate corresponding parts throughout the several views, A represents a wheeled support or truck composed of a platform B, suitably secured to side bars C and cross-bars D and mounted upon axles E, journaled in bearings upon the under side of said side bars and carrying wheels E'. This wheeled support or truck may be made of any desired dimensions to serve either as a platform-car or as an ordinary hand-car and be provided with draw-gear for connection with an engine or other cars or with handles, whereby it may be pushed or drawn along the track by the working crew. In the present instance the truck is shown embodied in the form of a hand-car, having handles *f* formed by extending and properly shaping the ends of the side bars in the usual manner; but of course handles of any desired character may be employed.

Upon the wheeled support or truck is detachably mounted a body comprising a rotatable platform G and two tilting boxes H. The platform G is rotatably mounted through the medium of a pivot-pin or king-bolt $i$, passed downwardly therethrough and through an opening in the center of the truck-platform, and is provided upon its under side with a circular or ring-shaped plate J, adapted to turn upon a similar plate J', secured upon the top or upper side of the truck-platform, and thus form therewith a turn-table upon which the body may be easily rotated. This construction of turn-table is deemed preferable, as it allows the body to lie down closely upon the truck, so that tilting boxes of large capacity may be employed, but is not absolutely essential, and may be modified, if desired, in any of the well-known ways—as, for instance, by employing rollers or equivalent devices upon one part to traverse a trackway upon the other part. The rotatable platform is approximately of the same dimensions as the truck and extends longitudinally thereof and may be turned to discharge the load in either direction, as hereinafter described. The tilting boxes H are mounted upon the top and at opposite ends of the rotatable platform and each is open at its top and outer or discharge end and comprises in its construction two side pieces *j*, having their upper edges inclined downwardly from their inner or rear to their outer or front ends and connected by cross-bars *k*, a rear end piece *l*, secured to said cross-bars and side pieces and of less depth than the rear ends of the latter, so that its lower edge terminates above the rear edges of the side pieces, and a bottom *m*, resting on and secured to the cross-bars. Each box thus tapers from one end to the other and is of correspondingly less depth at its outer end than at its inner end and is made somewhat wider than the platform, so that the projecting lower edges of the side pieces fit down upon and bear against the outer surfaces of the side bars of said platform and serve as braces to prevent undue strain on the pivots of the box when the platform is rotated. The boxes are pivotally mounted upon the outer ends of the side bars of the platform by pivot pins or bolts *n*, passed through the side pieces thereof adjacent to the lower edges of the latter and a short distance of the center of gravity of each box, so that the greater weight of the load at the inner or rear end of the box will prevent the same from accidentally tilting under ordinary conditions, while the inclination of the box permits of a quick shifting of the load forward of the center of gravity, and consequently an easy tilting of the box and ready discharge of the load. The side pieces of the boxes are provided at their outer ends with handles *p*, whereby the body may be rotated, and during this operation, as hereinbefore explained, the lower ends of said side pieces bear against the sides of the rotatable platform and permit of a ready shifting of the body without straining the pivot connections. To absolutely insure prevention of accidental tilting of the boxes, the inner rear or closed ends of said boxes may be connected by a locking device of any preferred construction, that shown in the present instance consisting of a hook *q*, mounted upon one box or tilting section and adapted to engage a staple or keeper *r* on the other box or section, and to facilitate dumping each box may be provided upon its side near its rear end with handles *s*. Suitable means may also be provided to hold the turn-table locked.

The normal position of the parts is that shown in Fig. 1, and the operation will be readily understood from the foregoing description taken in connection with the drawings. When it is desired to dump the load in the center of the track on which the car is running, the boxes are simply tilted without changing the position of the rotatable platform unless it is desired to dump the contents of both boxes at one end of the car. If, however, it is desired to dump the contents of both boxes simultaneously on opposite sides of the track, the rotatable platform is turned to a position at right angles to the truck, as shown in Fig. 3, and the boxes tilted. By shifting the body in this manner and tilting one box and reversing the rotatable table to bring the other box to the position occupied by tilting the first-named box the contents of both boxes may be dumped on one and the same side of the track. The truck may be readily and conveniently converted into a hand-car for use in handling ties, &c., by removing the rotatable body, which operation, owing to the construction set forth, can be easily effected.

It will of course be understood that changes in the form, proportion, and minor details of construction other than those indicated may be made within the scope of the invention without departing from the spirit or sacrificing any of the advantages thereof.

Having thus described the invention, what is claimed as new is—

1. A dumping-car, comprising a wheeled truck or support adapted to serve as a platform-car, a body-platform detachably and rotatably mounted upon said truck, and tilting boxes adapted to rest in a horizontal position upon said body-platform and pivoted at their bases to the opposite ends thereof and having handles at their outer ends whereby they may be tilted and the body-platform rotated.

2. A dumping-car, comprising a wheeled truck or support, adapted to serve as a platform-car, a body-platform rotatably mounted thereon, and tilting boxes adapted to rest horizontally upon said body-platform with their inner ends in close proximity and at or near the center of the platform, each box being pivoted forward of its center to the end of the body-platform, substantially as described.

3. A dumping-car comprising a wheeled truck or support, adapted to serve as a platform-car, a body-platform rotatably mounted thereon, and inclined tilting boxes adapted to rest in a substantially-horizontal position upon said body-platform, said boxes being closed and of greatest depth at their inner ends and open and of least depth at their outer ends and pivoted forwardly of their centers to the ends of the body-platform.

4. A dumping-car, comprising a wheeled truck or support adapted to serve as a platform-car and carrying one member of a turn-table, a rotatable body-platform mounted on said truck and carrying the other part of the turn-table, a pivot-pin connecting the body-platform and truck and independent of the turn-table, tilting boxes pivoted at their bases and forwardly of their centers to the ends of the body-platform and provided at their outer ends with handles, and locking means for connecting the inner ends of the boxes.

5. A dumping-car, comprising a wheeled support or truck adapted to serve as a platform-car, and a detachable body rotatably mounted thereon and composed of a platform, and a pair of tilting boxes mounted upon the opposite ends of said platform and provided with a locking device to hold them connected against tilting, side portions bearing against the sides of said platform, and handles whereby the body in entirety may be rotated on said truck.

6. A dumping-car, comprising a wheeled truck or support adapted to serve as a platform-car, a body-platform detachably and rotatably mounted on the truck, and tilting boxes pivoted upon the opposite ends of said body-platform and adapted to rest thereon.

In testimony whereof I affix my signature in presence of two witnesses.

JOHN T. ARGO. [L. S.]

Witnesses:
M. C. SWINFORD,
W. H. LAIS.